US005493633A

United States Patent [19]
Obata

[11] Patent Number: 5,493,633
[45] Date of Patent: * Feb. 20, 1996

[54] DEDUCTION INFERENCE SYSTEM FOR SOLVING COMPLEX PROPOSITIONAL LOGIC PROBLEMS IN RESPONSE TO SIGNALS FROM A PLURALITY OF SYSTEM SENSORS

[76] Inventor: Takashi Obata, 1-203, 3-8-21 Shimoigusa, Suginami-ku, Tokyo, Japan

[*] Notice: The portion of the term of this patent subsequent to Feb. 14, 2012, has been disclaimed.

[21] Appl. No.: 307,067

[22] Filed: Sep. 16, 1994

Related U.S. Application Data

[63] Continuation of Ser. No. 854,020, Mar. 19, 1992, Pat. No. 5,390,287, which is a continuation-in-part of Ser. No. 511,433, Apr. 13, 1990, abandoned.

[30]    Foreign Application Priority Data

Apr. 26, 1989   [JP]   Japan ..................................... 1-106772

[51] Int. Cl.$^6$ .................................................. G06F 15/18
[52] U.S. Cl. .............................. 395/67; 395/81; 395/904; 395/906
[58] Field of Search .................................. 395/51, 61, 81, 395/904, 906, 67

[56]            References Cited

U.S. PATENT DOCUMENTS 5,119,318   6/1992   Paradies et al. ........................ 395/61

OTHER PUBLICATIONS

Looney et al, "Logical Controls via Boolean Rule Matrix Transformations," IEEE Trans. Syst., Man and Cybernetics, Nov./Dec. 1987, 1077–1082.

Andert et al, "A Verifiable, Autonomous Satellite Control System," 1989 IEEE Aerospace Applications Conf., Feb. 1989.

*Primary Examiner*—Robert W. Downs
*Attorney, Agent, or Firm*—Cushman, Darby & Cushman

[57]            ABSTRACT

A deduction inference system is connected to a plurality of sensor elements, a display device, and an actuator mechanism. The deduction inference system processes stimulus sensor signals received from responding sensor elements. Each sensor signal uniquely identifies condition/status information representative of the particular sensor element transmitting that signal. Using preestablished knowledge rules previously programmed into its memory, the deduction inference system is capable of executing and solving a "non NP-complete" deduction inference on the inputted stimulus sensor signals. The resulting data can then be presented onto a display device as a user friendly "smart" informational message or transmitted to an actuator mechanism attached thereto to control electromechanical devices and provide a real-time response to changing condition/status information transmitted form the plurality of sensor elements.

4 Claims, 10 Drawing Sheets

S1 and S2 and S3 and S4 then "Flag is set"

Fig. 4.

not S1 and S2 and not S3 and S4 then "Flag is set"

Fig. 5.

s1 or not s2 or not s3 or s4 then "Flag is set"

Fig. 6.

"Flag is set" then r1 and r2 and not r3 and r4

Fig. 7.

"Flag is set" then not r1 or r2 or r3 or not r4

Fig. 8.

s1 or not s2 or not s3 or s4 then r1 and not r2

Fig. 9.

s1 or s2 or .. sn then r

←→    not (s1 or s2 .. or sn) or r
    ←→    (not s1 and not s2 ... and not sn) or r
    ←→    not s1 or r,
               not s2 or r,
               not s3 or r,
               ....
               not sn or r s then r1 or r2 or r3 .. rm     ←→    not s or r1 or r2 ...or rm s1 and s2 ... and si then r     ←→    not (s1 and s2 .. and si) or r
    ←→    not s1 or ... or not si or r s then r1 and r2 .. and rj     ←→    not s or (r1 and ... and rj)
    ←→    not s or r1,
               not s or r2,
               not s or r3,
               .........
               not s or rj

Fig. 10.

| row ↓ | p | q | r | s | t | x |
|---|---|---|---|---|---|---|
| R(1) | a11 | a12 | a13 | a14 | a15 | a16 |
| R(2) | a21 | a22 | a23 | a24 | a25 | a26 |
| R(3) | a31 | a32 | a33 | a34 | a35 | a36 |
| R(4) | a41 | a42 | a43 | a44 | a45 | a46 |
| R(5) | a51 | a52 | a53 | a54 | a55 | a56 |
| R(6) | a61 | a62 | a63 | a64 | a65 | a66 | column → C(1)C(2)C(3)C(4)C(5)C(6)

Fig. 11.

p then q
not p then q or r
not s then t
not r then x
r then not s
not q

Fig. 12.

not p or q
p or q or r
s or t
r or x
not r or not s
not q $$\begin{array}{cccccc} p & q & r & s & t & x \end{array}$$

$$\left| \begin{array}{cccccc} -1 & 1 & 0 & 0 & 0 & 0 \\ 1 & 1 & 1 & 0 & 0 & 0 \\ 0 & 0 & 0 & 1 & 1 & 0 \\ 0 & 0 & 1 & 0 & 0 & 1 \\ 0 & 0 & -1 & -1 & 0 & 0 \\ 0 & \{-1\} & 0 & 0 & 0 & 0 \end{array} \right|$$

Fig. 13.

{ } indicates pivot position $$\begin{array}{cccccc} p & q & r & s & t & x \end{array}$$

$$\left| \begin{array}{cccccc} \{-1\} & 0 & 0 & 0 & 0 & 0 \\ 1 & 0 & 1 & 0 & 0 & 0 \\ 0 & 0 & 0 & 1 & 1 & 0 \\ 0 & 0 & 1 & 0 & 0 & 1 \\ 0 & 0 & -1 & -1 & 0 & 0 \\ 0 & -1 & 0 & 0 & 0 & 0 \end{array} \right|$$

Fig. 14.

$$\begin{array}{cccccc} p & q & r & s & t & x \end{array}$$

$$\begin{vmatrix} -1 & 0 & 0 & 0 & 0 & 0 \\ 0 & 0 & \{1\} & 0 & 0 & 0 \\ 0 & 0 & 0 & 1 & 1 & 0 \\ 0 & 0 & 1 & 0 & 0 & 1 \\ 0 & 0 & -1 & -1 & 0 & 0 \\ 0 & -1 & 0 & 0 & 0 & 0 \end{vmatrix}$$

*Fig. 15.*

$$\begin{array}{cccccc} p & q & r & s & t & x \end{array}$$

$$\begin{vmatrix} -1 & 0 & 0 & 0 & 0 & 0 \\ 0 & 0 & 1 & 0 & 0 & 0 \\ 0 & 0 & 0 & 1 & 1 & 0 \\ 0 & 0 & 0 & \{-1\} & 0 & 0 \\ 0 & -1 & 0 & 0 & 0 & 0 \end{vmatrix}$$

*Fig. 16.*

$$\begin{array}{cccccc} p & q & r & s & t & x \end{array}$$

$$\begin{vmatrix} -1 & 0 & 0 & 0 & 0 & 0 \\ 0 & 0 & 1 & 0 & 0 & 0 \\ 0 & 0 & 0 & 0 & 1 & 0 \\ 0 & 0 & 0 & -1 & 0 & 0 \\ 0 & -1 & 0 & 0 & 0 & 0 \end{vmatrix}$$

not p r t not s not q

DEDUCTION INFERENCE SYSTEM FOR SOLVING COMPLEX PROPOSITIONAL LOGIC PROBLEMS IN RESPONSE TO SIGNALS FROM A PLURALITY OF SYSTEM SENSORS

This is a continuation of application Ser. No. 07/854,020, filed Mar. 19, 1992, now U.S. Pat. No. 5,390,287, which is a continuation-in-part of application Ser. No. 07/511,433, filed Apr. 13, 1990, now abandoned.

BACKGROUND OF THE INVENTION

1. Field of the Invention

This invention relates to a data processing system, more particularly to a deduction inference system coupled to a plurality of sensor elements, a display device, and an actuator mechanism. The deduction inference system processes stimulus sensor signals received from responding sensor elements. Each sensor signal uniquely identifies condition/status information representative of the particular sensor element transmitting that signal.

Using preestablished knowledge rules previously programmed into its database, the deduction inference system is capable of executing and solving a "non NP-complete" deduction inference based on the inputted stimulus sensor signals. The resulting data can then be presented onto a display device as a user friendly "smart" informational message.

The resulting data can also be used by the coupled actuator mechanism to "robotically" control electro-mechanical devices to provide a real-time response to changing condition/status information transmitted form the plurality of sensor elements. 2. Description of the Related Art A computer executed algorithm is referred to as "NP-Complete" if the executing time required to carry a deduction inference to completion increases exponentially as the number of transmitted stimulus sensor signals is increased.

A stimulus sensor signal, in the present context, is the output signal associated with a sensor element (such as a temperature gauge, a light measuring device, a speedometer, etc.).

The stimulus sensor signal is one of possibly hundreds or thousands of such signals that are fed simultaneously into a deduction inference system for generating a "smart" response.

A response is defined as "smart" when the processing entity, i.e., the human brain or data processing system, is capable of using preestablished associational logic stored therein, to make informed, real-time deductions based on inputted stimulus sensor signals.

Because NP-complete deduction inference algorithms require, for all practical purposes, near infinite execution time to generate a "smart" response when the number of sensor elements contributing to that response exceed several hundred or more elements, the practical use of conventional deduction inference tools presently in use in modern deduction inference systems has yet to be efficiently discerned.

Prolog (PROgramming in LOGic) is one such popular deduction inference tool widely used with modern deduction inference systems to generate, in NP-complete execution time, "smart" responses for applications requiring real-time interaction to a severely limited number of sense stimuli.

Furthermore, extremely rigid restrictions for expressing negative statements make Prolog greatly inadequate for designing both simple and complex knowledge rules necessary for generating the deduced response.

SUMMARY OF THE INVENTION

It is an object of the present invention to provide a data processing system, more particularly a deduction inference system, which overcomes the deficiencies of conventional "smart" machines.

More specifically, the deduction inference system of the present invention is capable of generating a deduced response using both preestablished knowledge rules, stored in a system database, and externally provided stimulus sensor signals in a "non NP-complete" time basis.

Thus, the increased processing speed of the present system over existing technologies, widely expands the possible applications of the deduction inference tool of the present invention in a variety of complex interactive systems.

BRIEF DESCRIPTION OF THE PREFERRED EMBODIMENTS

This invention relates to a data processing system which performs deduction inference in response to a plurality of inputs from sensors embedded into a mechanical system (23).

The deduced outputs are then transmitted to display means (24) for visual monitoring, or to actuator mechanisms (25) to restore normal conditions.

The present invention implements a deduction inference tool (matrix based propositional logic solving algorithm) which can execute and solve a deduction inference in a "non NP-Complete" time basis.

This deduction inference would drastically expand the application field of artificial intelligence systems.

Electronic signals transmitted from sensors to a deduction inference system are generally classified in one of three states.

(i) The "Null" state defines a sensor state response which indicates that a sensor is in a non-active mode;

(ii) The "1" state defines a sensor state response that has been previously determined to be "normal".

(iii) The "−1" state defines a sensor state response that has been previously determined to be "abnormal".

For example, if sensors are chosen to sense changes such as changes in temperature, device operating speed, or weight, a "1" sensor output signal can be selectively assigned to indicate that the measured result is within predetermined tolerance levels; while a "−1" value would otherwise indicate that the measure result falls outside the predetermined tolerance level.

If the sensor is not active (e.g., turned off; disabled; etc.), the sensor automatically transmits a null signal; or no signal, which is interpreted as a null signal. If active, however, the sensor will send either a normal "1" signal or an abnormal "−1" signal.

If we further denote a normal "1" signal as "s1" and an abnormal "−1" signal as "not s1", then a deduction inference system is provided for generating a deduced response based on any received combination of sensor output signals which can be expressed by the proposition:

(If) (not) s1 {or-and} (not) s2 {or-and} s3 ... {or-and} (not) sm then (not) r1 {or-and} (not) r2 ... { or-and} (not) rn where m and n are any positive integers; words inside the () can be omitted; and {or-and} implies that only one of "or" or "and" is to be allowed in the expression.

The general "if ... then" expression stated above is all inclusive of all the possible previously defined knowledge rules stored in a memory of the deduction inference system.

Thus, just as 's#' is used to represent a normal sensor element input, 'r#' is used to represent a normal flag condition that may or may not be set, alone or in combination with other flags, in response to at least one sensor element input.

The deduction inference system must first select the applicable knowledge rules that are germane to the presently active sensor elements; in response to received stimulus sensor signals {−1, 1} from the attached sensor elements.

It is easily recognized that unlike conventional deductive inference systems which do not permit the use of "not" and "or" in both sides of the "then" in the "If ... then" expression, the presently disclosed system allows such expressions.

The resulting "If ... then" expressions are then converted to a computer understandable form.

The term "Standard form" is used to describe the converted statements, which defer only to the extent that the "If" "then" words within each corresponding expression are substituted with equivalent binary logic.

For example, the expressions "s1 or not s2" or "not a" are both in standard form.

A flag is set by the deduction inference system, whenever an electronic signal is inputted.

As explained later in detail, the expression:

not s1 and s2 and not s3 and s4 then "flag is set"

precisely describes the condition in which the flag is set (i.e., the flag is set if and only if sensors "1" and "3" both transmit abnormal signals and sensor "2" and "4" transmit normal signals).

Figure 1:
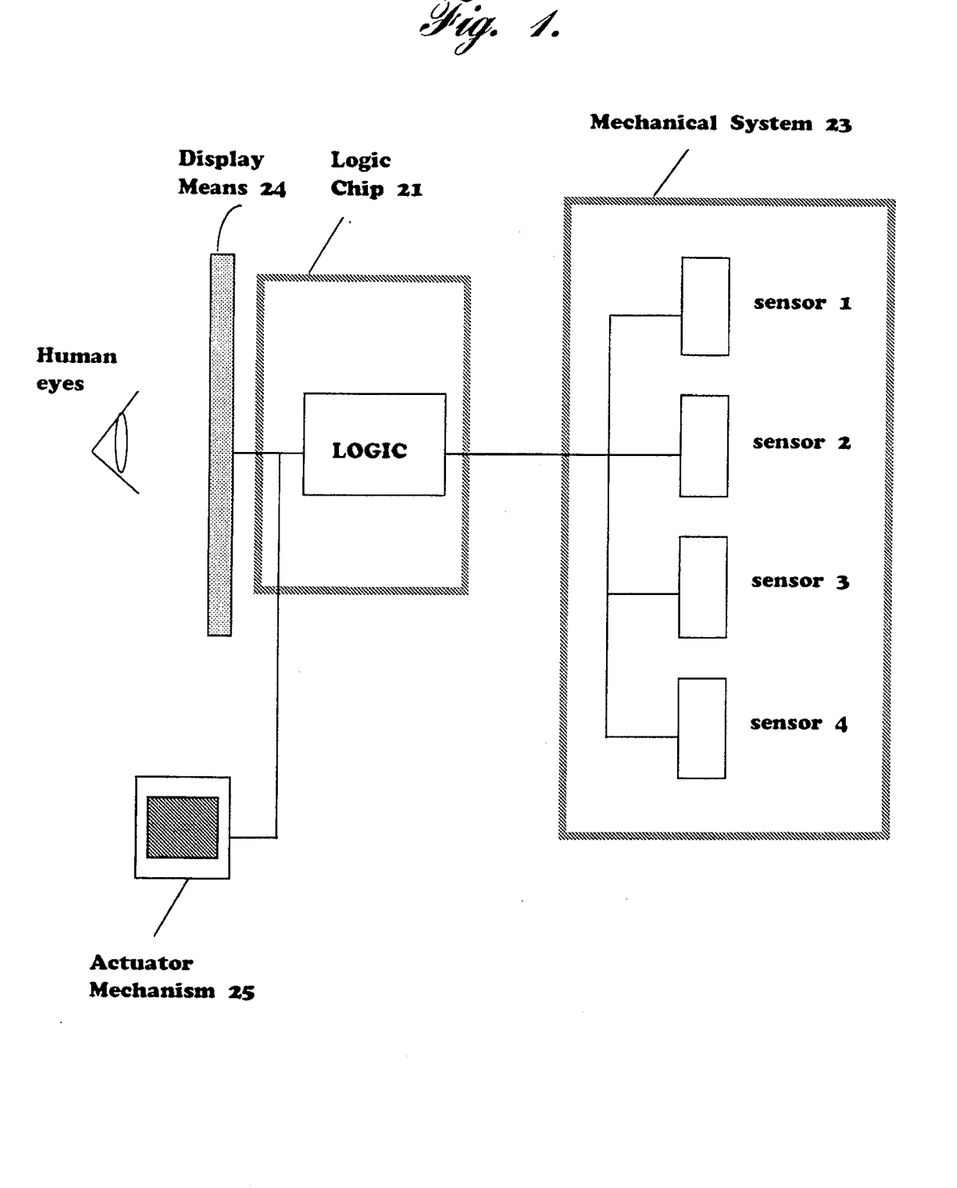
FIG. 1 is a block diagram of a data processing system according to an embodiment of the present invention.

FIG. 1 is a block diagram of one embodiment of the invention in which there are four sensors. The number of sensors is arbitrary and the number selected here is only for illustration by way of a first example.

The sensors in particular could be any of the following, but not limited to, pressure, vibration or temperature gauges, television cameras, smoke detectors, exposure meters, etc.

Sensor signals are converted into electronic signals and transmitted into processing chip (21).

Display means (24) could be a TV screen, a liquid crystal display device, a plasma screen or any other such visual monitor or display device.

Actuator mechanism (25), in response to the output from processing chip (21), can induce a physical response by transmitting any number of activation signals necessary to restore the stability of the system. Such activation signals can include causing an electro-mechanical device to replace detected faulty components with back-up components or redundant systems; reducing system power to cool down overheated components; activating fire extinguisher valves, etc.

Figure 2:
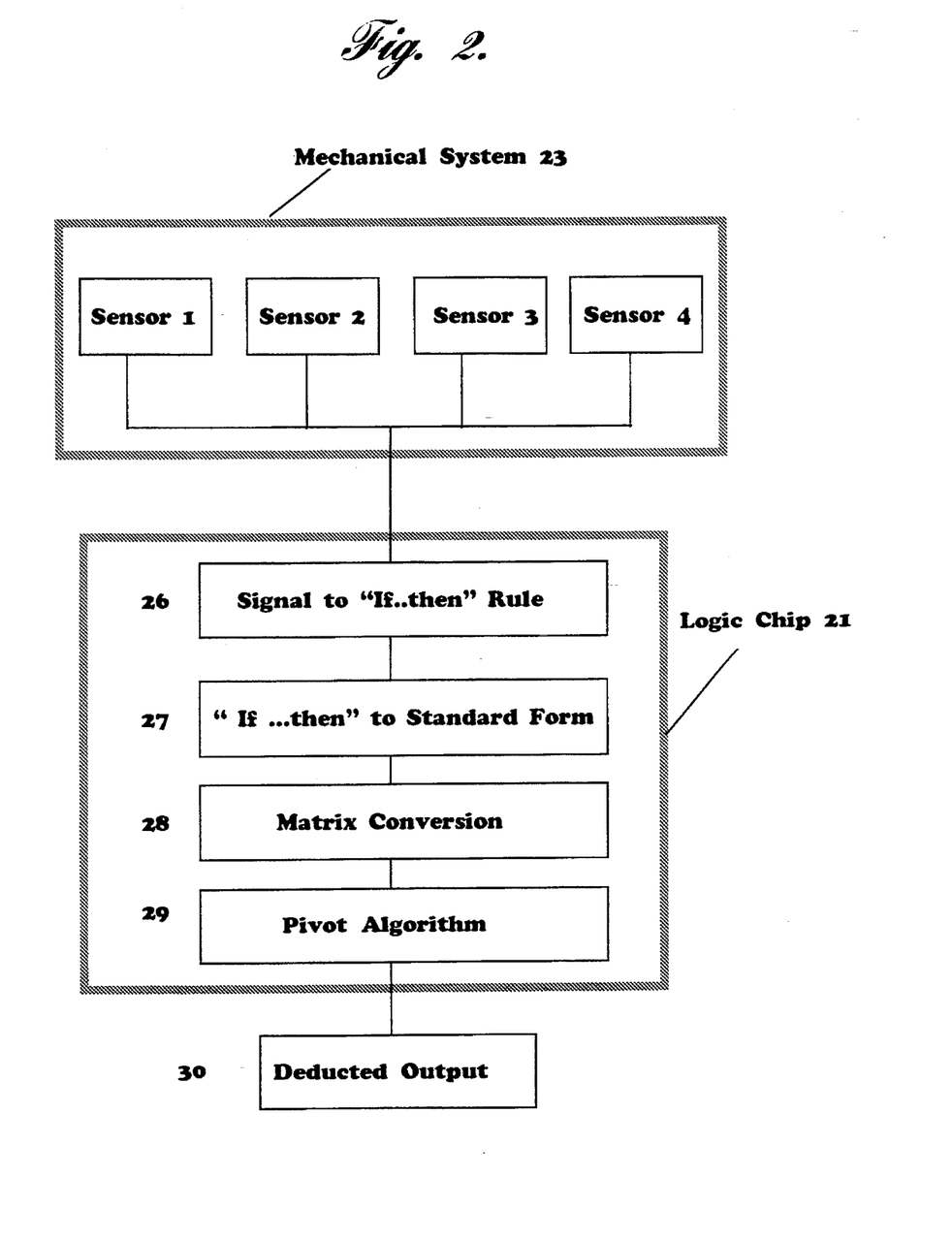
FIG. 2 is a generalized flow diagram illustrating the block data processing operations performed within a processor chip according to an embodiment of the present invention.

FIG. 2 is a generalized flow diagram illustrating the block data processing operations performed within processor chip (21) according to an embodiment of the present invention.

The various combinations of sensor signals are first converted into "if ... then" expressions using the previously explained knowledge rules (block 26). This procedure is explained later in connection with FIGS. 3 to 8.

These "If ... then" rules are then transformed into "standard form (block 27), followed by conversion into matrix form (block 28).

By application of a "pivot algorithm" (block 29) to the previously deduced matrix, processor chip (21) generates the deduced output of the deduction inference system (block 30).

Processing chip (21) contains an inference engine that performs a deduction inference in non NP-complete time according to the following scheme:

(a) Conversion of signals into "If ... then" form.

(b) Transformation of "If ... then" rules into "standard form".

(c) "Standard form" then transformed into a matrix form.

(d) The matrix equation "solved" using a 'pivoting algorithm' to generate a set of solutions corresponding to a deduced output.

(e) Solutions are then inverted into the signal-response domain.

Figure 3:
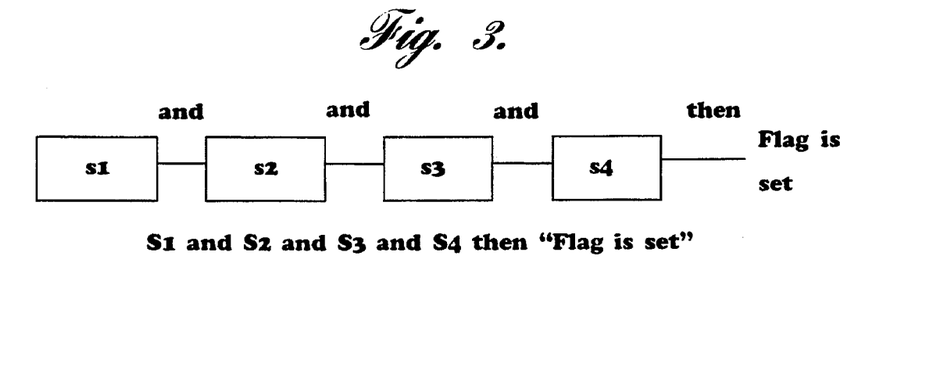
FIGS. 3 to 8 illustrate various preestablished knowledge rules which the processor chip uses to generate constructive "If . . . then" clauses based on the inputted stimulus sensor signals.

In FIG. 3, sensor signals are shown connected in logical series. A flag is set in processing chip (21) if and only if "s1", "s2", "s3" and "s4" occur simultaneously. In "if ... then" representation, this is expressed as:

s1 and s2 and s3 and s4 then "flag is set"

Figure 4:
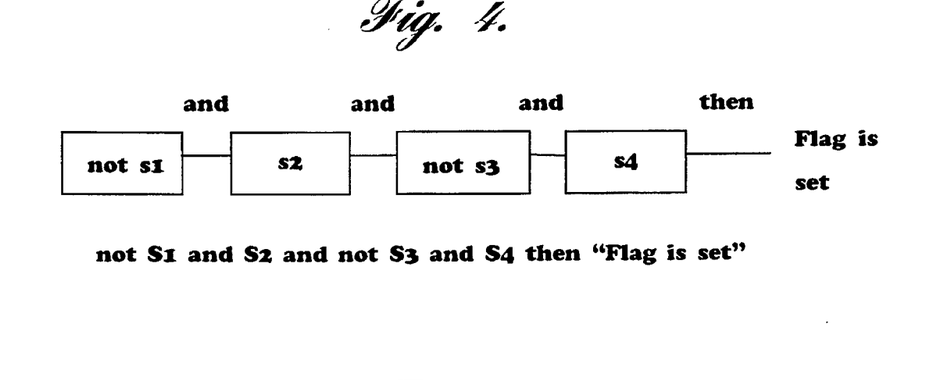

In FIG. 4, sensor signals are shown connected in logical series. A flag is set if and only if four signals "not s1", "s2", "not s3" and "s4" take place simultaneously. This can be expressed as:

not s1 and s2 and not s3 and s4 then "flag is set"

Figure 5:
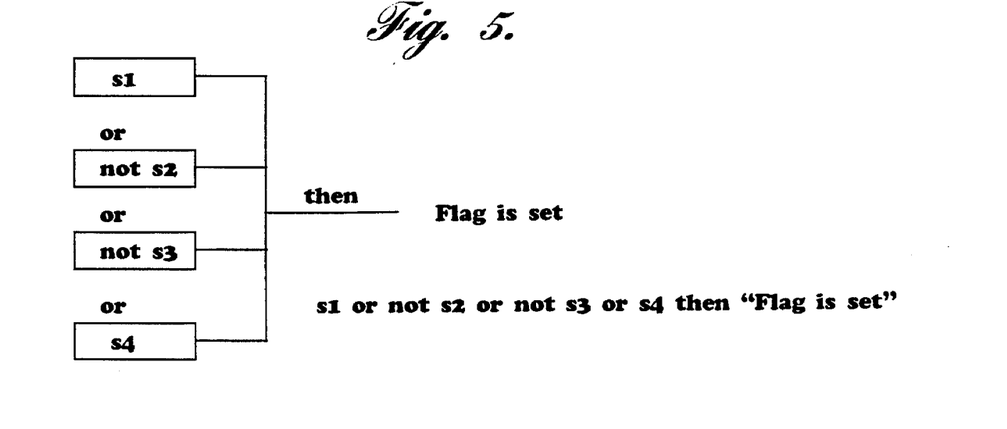

In FIG. 5, a flag is set if at least one of the signals "s1", "not s2", "not s3" or "s4" is sent to processing chip (21). This can be expressed as:

s1 or not s2 or not s3 or s4 the "flag is set"

Figure 6:
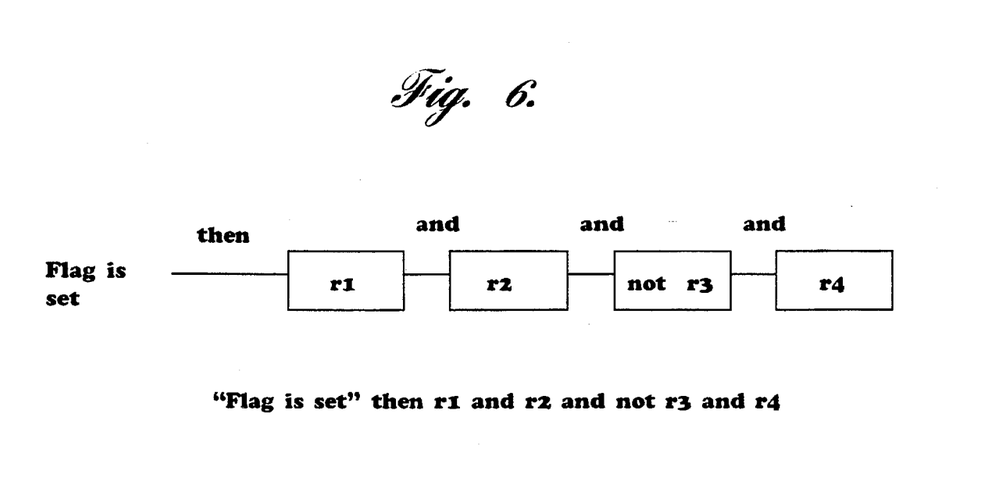

FIG. 6 illustrates an example of a possible programmed condition generated by processing chip (21) in response to a "flag-is-set" condition. If "flag is set", then responses "r1", "r2", "not r3" and "r4" occur simultaneously. This can be expressed as:

"flag is set" then r1 and r2 and not r3 and r4.

Figure 7:
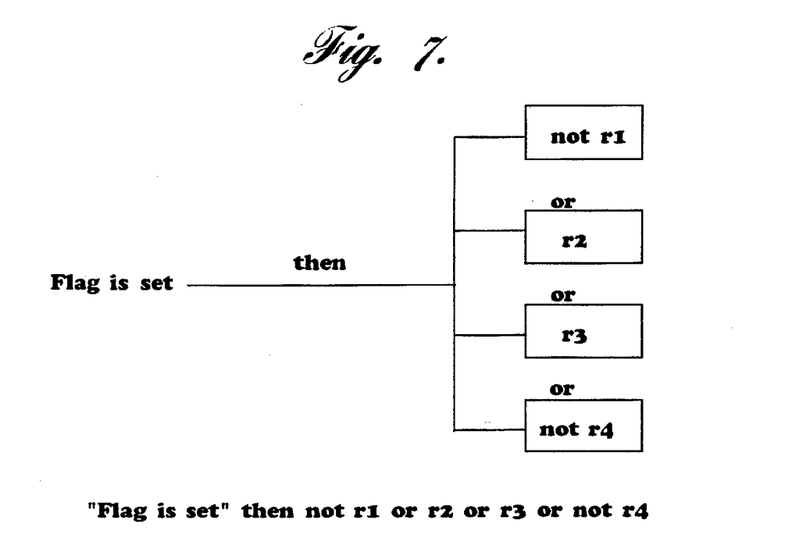

FIG. 7 illustrates a different state of events. If "flag is set", at least one of four responses "not r1", "r2", "r3" or "not r4" will occur. This can be expressed as:

"flag is set" then not r1 or r2 or r3 or not r4

Figure 8:
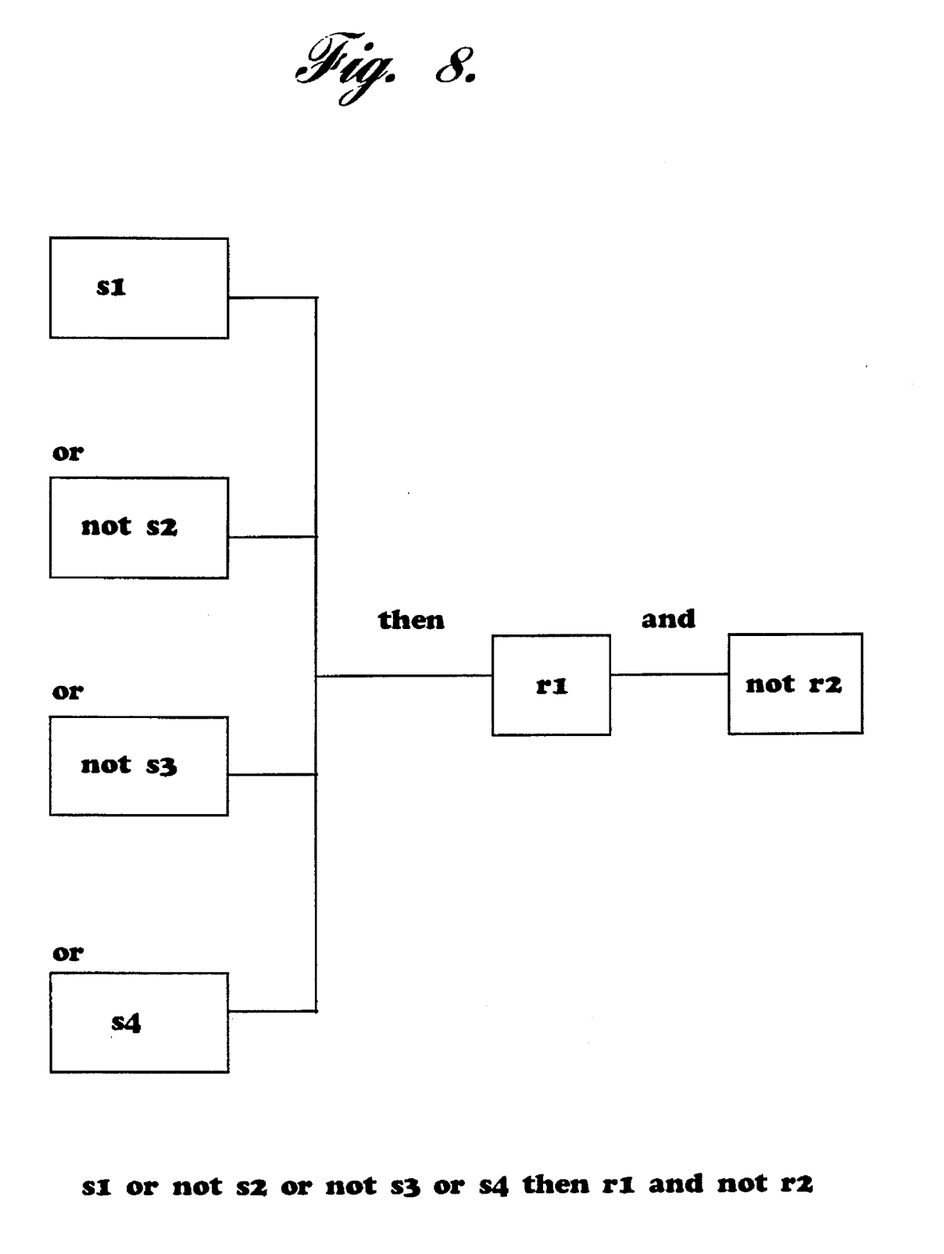

FIG. 8 illustrates an example where sensor signals and response conditions are combined and expressed in "If . . . then" form as:

s1 or not s2 or not s3 or s4 then r1 and not r2

Figure 9:
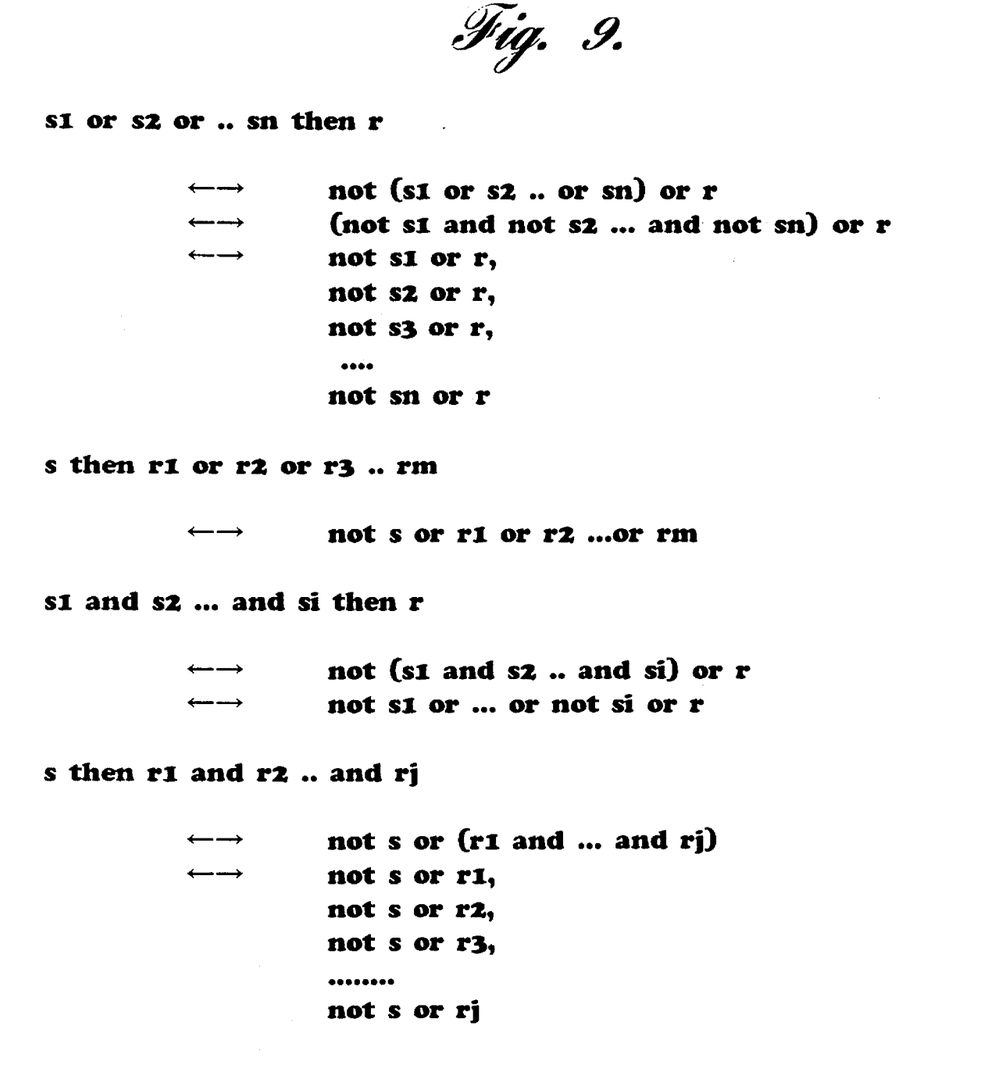
FIG. 9 shows a number of examples for converting the "If . . . then" clauses to equivalent 'OR' logic transformation formulae.

Using propositional logic laws, we can now verify, as shown in FIG. 9, the validity of various equivalent expressions. The sign "<—>" shall be interpreted as meaning "equivalent to".

On this note, any "if . . . then" expressions can be transformed into standard form forming a plurality of logic transformation formulae.

Figure 10:
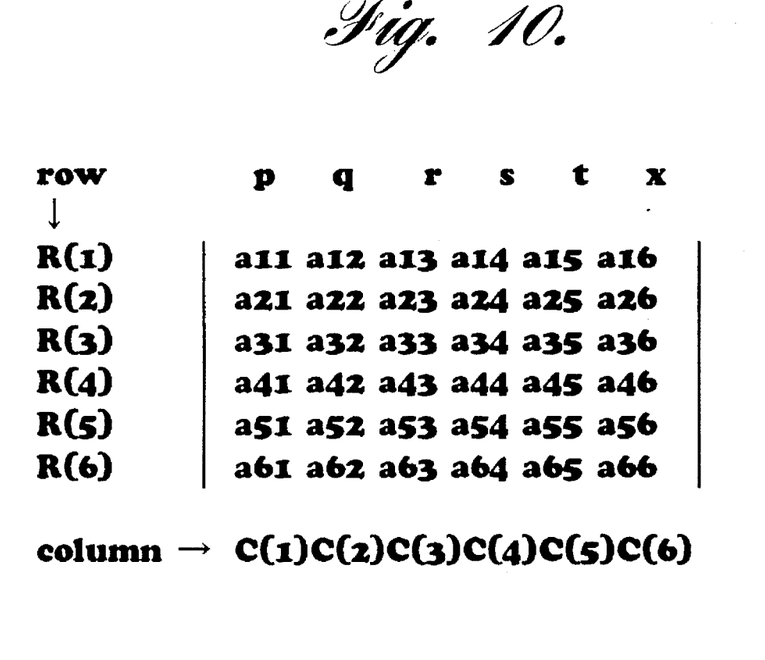
FIG. 10 denotes a general matrix table for representing logic transformation formulae.

FIG. 10 illustrates a general matrix table for representing logic transformation formulae.

Figure 11:
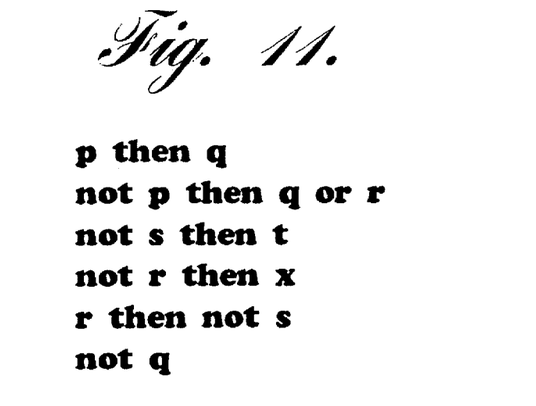
FIG. 11 is an example of a possible set of "If . . . then" clauses which are to be processed.
Figure 12:
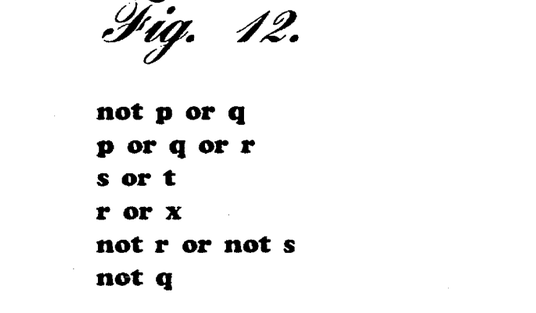
FIG. 12 illustrates the set of 'OR' logic transformation formulae for the set in FIG. 11.

The "If . . . then" rules illustrated in FIG. 11, once transformed into standard form, will appear as shown in FIG. 12. These are in turn transformed into a single matrix table representation generally denoted as in FIG. 10.

Figure 13:
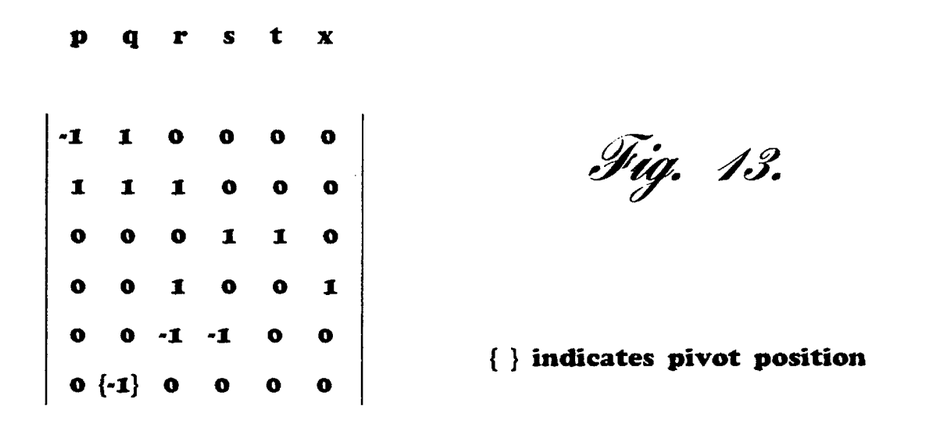
FIG. 13 denotes an equivalent matrix representation of the set in FIG. 12.

FIG. 13 shows an equivalent matrix representation of the logic transformation formulae set of FIG. 12.

FIGS. 14 to 17 illustrate the first to fourth matrix transformation steps deduced, respectively, by applying a pivot algorithm to the matrix of FIG. 13. The pivot algorithm is a programming tool which performs matrix manipulation in an ordered manner to provide a finite matrix solution.

The associational steps included in the pivot algorithm are explained as follows:

Step 1: Among horizontal rows of a given matrix, a row is first selected having only one non-zero (1 or −1) variable. In the example of FIG. 13, row r(6) is the only row in the matrix having a single non-zero position, variable "q". The "pivot" variable is "q" at "pivot" position a62. At this initial stage of the matrix solving step, we shall assume such pivot variable always exists.

Step 2: The "pivot" variable is then compared with other row elements in the same pivot column. Whenever an element having an opposite sign is found in the remaining rows, that element (positions a12 and a22 in FIG. 14 meet this condition) is eliminated. If an element is found having the same sign as the sign of the pivot variable, that entire row is eliminated from the matrix; thus forming a new matrix. This process decreases the number of non-zero elements in the row.

Step 3: Continuing in this fashion, produces new pivot variables along remaining rows. Repeat steps 1 and 2 until all possible pivot variables have been enumerated. When no further pivot variable can be found, this step is terminated.

Once the last matrix solving step is terminated, by inverting the resulting matrix back to a series of logic transformation formulae, the solution of the deduction inference problem is presented.

Figure 14:
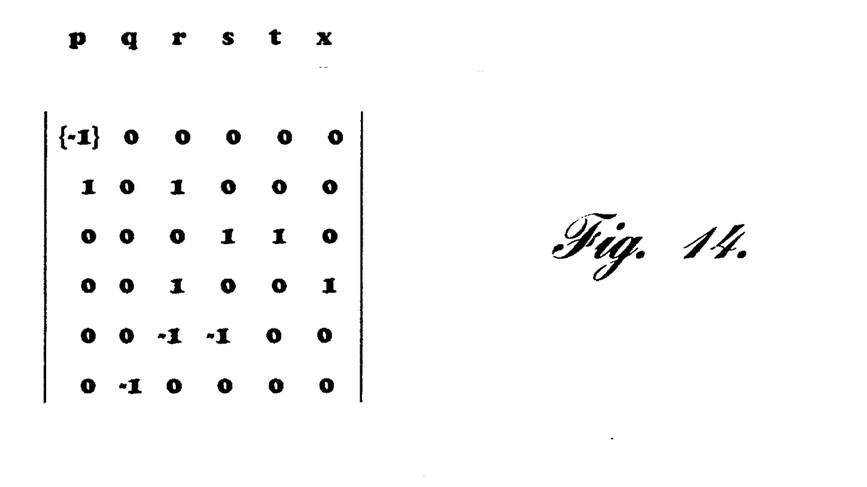
FIGS. 14 to 17 illustrate the first to fourth matrix transformation steps deduced, respectively, by applying a pivot algorithm to the matrix of FIG. 13.
Figure 15:
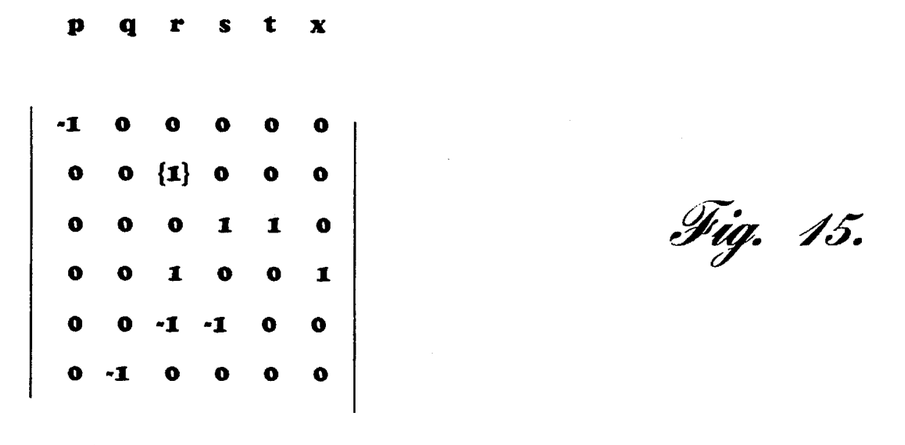
Figure 16:
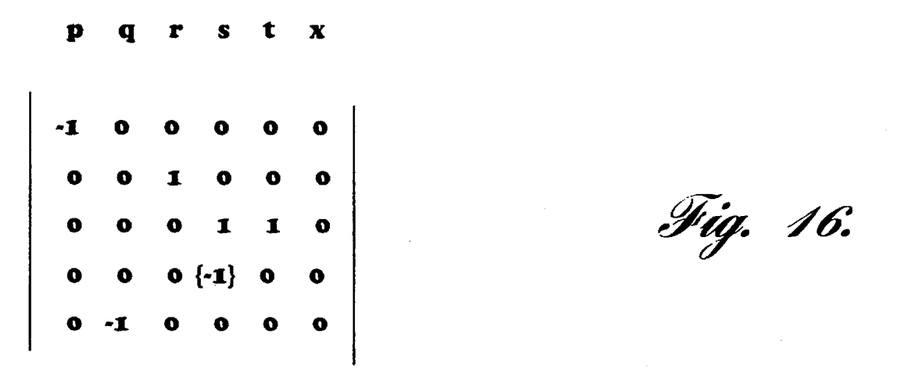
Figure 17:
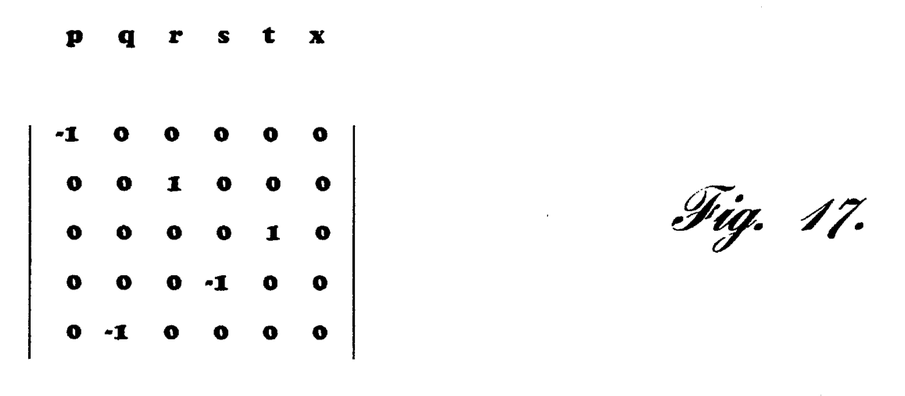
Figure 18:
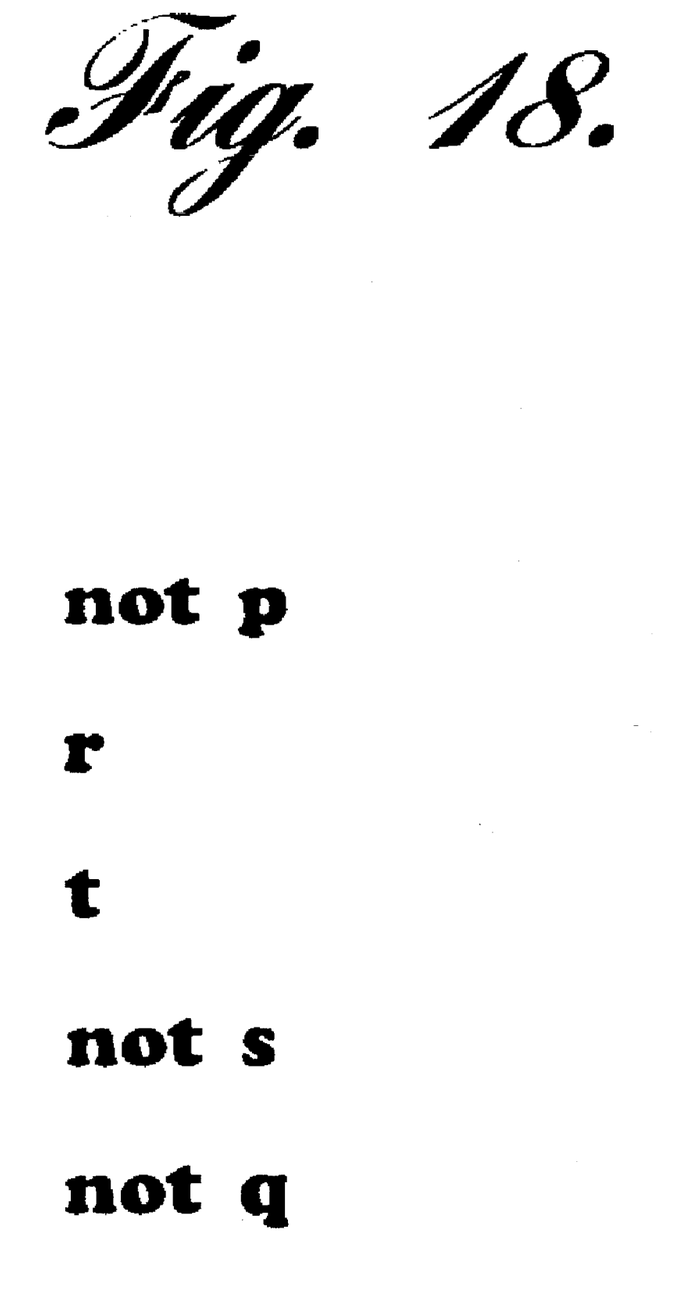
FIG. 18 denotes a deduced output which is based on the last matrix transformation step illustrated in FIG. 17.

In FIG. 14, the new pivot variable is "p". After eliminating element a21, we obtain a matrix solution step as in FIG. 15. "r" then becomes the new pivot variable. Eliminating a53 and omitting row R(4) results in a matrix solution step as in FIG. 16. The following new pivot variable is "s". Eliminating a34, the subsequent matrix solution step is shown in FIG. 17. At this point, since no new pivot variable can be found, the matrix solution process is terminated. Converting the matrix of FIG. 17 to a user friendly expression of "not" and "OR" terms, the solution is presented as shown in FIG. 18.

If we can assume that "n" standard form expressions are presented for matrix manipulation at the very first step of the pivoting procedure, there are at most n−1 other elements included in the search step of variables having an opposite sign. In the second search, there are at most n−2 elements. In the third stage, there are at most n−3 elements. Continuing in this manner, the maximum number of searches collectively needed can be represented as:

$$(n-1)+(n-2)+(n-3)+\ldots+2+1=n(n-1)/2.$$

Thus, one can readily appreciate that the processor execution time necessary to carry the algorithm to completion increases roughly in proportion to the square power of the number of standard form expressions "n".

On this note, the assertion is made that the deduction inference system of the present invention can generate a deduced output in the manner described above in a non NP-complete time basis.

Robotic systems generally include mechanical sensors such as a TV camera, a temperature gauge, a color analyzer, a weight measurement gauge, and the like.

Although there are only very few artificial intelligence systems that can automatically determine subsequent motion patterns in response to changes in the surrounding environment, such movements represent a pre-programmed sequence of actuator movements and are not based upon any actual "logic inference" per se. Thus, implementation of the deduction principles defined in the present invention would significantly enable a robot to respond in an intelligent "smart" manner.

For instance, if sufficient knowledge rules are stored in the deduction inference system of the present invention, it may now be practical to design a robot that is capable of deductively distinguishing a male from a female in response to a large number of sensory input information.

This will be possible using a deduction inference machine as in the present invention which includes a very large database and possesses the capability to solve deduced inferences quickly and efficiently in a manner described above in connection with the present invention.

Furthermore, the deduction inference system of the present invention can enjoy wide utility in complex mechanical systems where specific failures were until now almost impossible to isolate.

Because each particular part or component in a complex mechanical system, creates a unique failure pattern, a deduction inference system designer should be able to isolate an exact failure location once a sufficient number of sensors and associated knowledge rules are provided.

In aircraft and large sea vessels, the number of sensors that would be required to reasonably isolate component failures could easily exceed a couple of hundred sensors.

Similarly, the number of knowledge rules that would be required in designing a deduction inference machine to generate an optimal fault isolation response in such large scale systems could reach well over a thousand permutations.

It is under such applications where the deduction inference system of the present invention would find wide utility and fill the existing void of inadequately inefficient inference systems which operate on principles of an "NP-complete" time basis.

In special environments where quick human action is required to restore system normality, it may not always be possible for an operator to respond correctly within a limited amount of time. Thus, computer real-time response can be optimally realized in applications where human operators were until now the most efficient way to monitor emergency recovering tasks.

Once an emergency situation is detected, a deduction inference system, as described above in connection with the present invention, will transmit predetermined real-time commands to various electromechanical systems attached thereto.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A non NP-complete deduction inference system coupled to a plurality of sensors for transmitting condition/status signals to said deduction inference system and to output means for receiving command signals from said deduction inference system, said deduction inference system comprising:

memory storage means for storing a plurality of predetermined propositional logic clauses, each propositional logic clause defining the conditions under which at least one of a plurality of flags will be set in response to transmitted condition/status signals from said plurality of sensors;

means for selecting appropriate propositional logic expressions from said memory means in response to said transmitted condition/status signals and storing them in a working memory;

transformation formulae logic means for transforming said set of propositional logic clauses into a set of derivative clauses logically equivalent to said set of propositional logic clauses;

deducing means for performing deductions on the basis of said set of derivative clauses and said transmitted condition/status signals, said deducing means comprising:

means for identifying a unit clause containing a single variable "p" within said set of derivative clauses and removing said unit clause from said set of derivative clauses;

means for identifying compound clauses containing multiple variables within said set of derivative clauses;

means for searching said compound clauses for the variable "not p";

means for deleting the variable "not p" from each of said compound clauses to form a new set of derivative clauses, wherein said identifying means, said searching means, and said deleting means are repeatedly accessed until no more unit clauses containing a single variable can be identified; and means for generating a solution on the basis of said deductions;

and means for generating command signals to said output means based on the solution from said deducing means, said output means including an actuator mechanism which, in response to said command signals, induces a physical response by transmitting activation signals to restore the stability of at least one device whose operation is directly or indirectly monitored by said plurality of sensors.

2. The deduction inference system of claim 1, wherein said output means includes a display device and said command signals include the solution generated by the deducing means.

3. The deduction inference system of claim 1, wherein the activation signals transmitted by said actuator mechanism are real-time response commands to said at least one device attached thereto.

4. The invention according to claim 1, wherein said non NP-complete inference system is operable to carry deduction inferences to completion with execution times which increase at a less than exponential rate as the number of transmitted stimulus sensor signals increases linearly.

* * * * *